United States Patent
Chiang (10) Patent No.: US 11,284,463 B2
(45) Date of Patent: Mar. 22, 2022

(54) AUTOMATICALLY RESETTING INTERRUPTED NETWORK CONNECTIONS

(71) Applicant: T-Mobile USA, Inc., Bellevue, WA (US)

(72) Inventor: Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 146 days.

(21) Appl. No.: 16/513,460

(22) Filed: Jul. 16, 2019

(65) Prior Publication Data
US 2021/0022197 A1    Jan. 21, 2021

(51) Int. Cl.
| | |
|---|---|
| *H04W 76/11* | (2018.01) |
| *H04W 76/19* | (2018.01) |
| *H04W 28/22* | (2009.01) |
| *H04W 28/24* | (2009.01) |
| *H04W 80/10* | (2009.01) |
| *H04W 84/04* | (2009.01) |

(52) U.S. Cl.
CPC .......... *H04W 76/19* (2018.02); *H04W 28/22* (2013.01); *H04W 28/24* (2013.01); *H04W 80/10* (2013.01); *H04W 84/042* (2013.01)

(58) Field of Classification Search
CPC ............. H04W 36/0022; H04W 36/14; H04W 84/042
See application file for complete search history.

(56) References Cited

U.S. PATENT DOCUMENTS

| | | | |
|---|---|---|---|
| 2010/0074109 | A1 | 3/2010 | Klingenbrunn et al. |
| 2012/0155282 | A1* | 6/2012 | Dorenbosch ........ H04W 72/005 370/241.1 |
| 2014/0211619 | A1 | 7/2014 | Suryavanshi et al. |
| 2017/0013529 | A1 | 1/2017 | Persson et al. |
| 2018/0007550 | A1 | 1/2018 | Williams et al. |

(Continued)

FOREIGN PATENT DOCUMENTS

| | | | | |
|---|---|---|---|---|
| EP | 3462776 A1 | * | 4/2019 | ............ H04W 36/12 |
| WO | WO2019011107 A1 | | 1/2019 | |

OTHER PUBLICATIONS

3GPP, "3GPP Technical Specification Group Services and System Aspects; System Architecture for the 5G System; Stage 2 (Release 16)", vol. SA WG2, No. V16.1.0, Jun. 11, 2019, pp. 1-368.

(Continued)

*Primary Examiner* — Brian P Cox
(74) *Attorney, Agent, or Firm* — Lee & Hayes, P.C.

(57) ABSTRACT

Systems, devices, and techniques described herein relate to automatically resetting interrupted connections associated with a core network and/or an Internet Protocol (IP) Multimedia Subsystem (IMS) network, in order to successfully establish a dedicated tunnel through the core network and the IMS network. An example method includes transmitting, to the core network, a first request for services associated with a minimum Quality of Service (QoS) level and determining that a wait time has expired without having received a response confirming that a dedicated tunnel corresponding to the QoS level has been established. Next, the method can include transmitting, to the core network, a second request to reset a connection associated with the core network and the IMS network.

18 Claims, 6 Drawing Sheets

(56) References Cited

U.S. PATENT DOCUMENTS

| | | |
|---|---|---|
| 2018/0175970 A1 | 6/2018 | Jung et al. |
| 2018/0263066 A1* | 9/2018 | Chiang .................. H04W 4/90 |
| 2019/0149583 A1 | 5/2019 | Jutila et al. |
| 2019/0150039 A1 | 5/2019 | Raghunathan et al. |
| 2020/0245195 A1 | 7/2020 | Zhu et al. |
| 2020/0267606 A1 | 8/2020 | Huang-Fu |
| 2020/0305032 A1 | 9/2020 | Kuppelur et al. |
| 2020/0336979 A1 | 10/2020 | Aoyagi et al. |
| 2021/0021646 A1 | 1/2021 | Chiang et al. |

OTHER PUBLICATIONS

The Extended European Search Report dated Oct. 23, 2020 for European Patent Application No. 20181631.1, 11 pages.
The Extended European Search Report dated Oct. 28, 2020 for European Patent Application No. 20181636.0, 11 pages.
Motorola Mobility et al., "Support of EPS Fallback for voice without impacting IMS", vol. SA WG2, No. S2-185409, May 28, 2018, 8 pages.
Office Action for U.S. Appl. No. 16/513,579, dated Oct. 13, 2021, Chiang, "Timer-Initiated Fallback", 30 Pages.

* cited by examiner

AUTOMATICALLY RESETTING INTERRUPTED NETWORK CONNECTIONS

BACKGROUND

Modern terrestrial telecommunication systems include heterogeneous mixtures of 2nd, 3rd, and 4th Generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include 5th Generation (5G) cellular-wireless access technologies, among other forthcoming technologies, to provide improved bandwidth and decreased response times to a multitude of devices that may be connected to a network.

In some cases, Internet Protocol (IP) Multimedia Subsystem (IMS) networks can provide services in conjunction with various access technologies. The Multimedia Telephony Service (MMTel) is an IMS-based technology that can provide various services involving multimedia communication, such as voice, real-time video, video, text, file transfer, or the like. An IMS network can be used as an alternative to a Circuit-Switched (CS) network, in various network architectures.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques described herein relate to automatically resetting failed network connections using wait times. In particular implementations, the network connections can be associated with core networks and Internet Protocol (IP) Multimedia Subsystem (IMS) networks, such as interfaces between core networks and IMS networks.

Various services requested by mobile devices, and other types of User Equipment (UE), may be associated with a minimum Quality of Service (QoS) level. For instance, some services may be associated with a Guaranteed Bit Rate (GBR). Users may be particularly sensitive to delays in GBR services.

Networks may deliver QoS-sensitive services without significant delays by prioritizing the delivery of the services along particular paths through the networks. In certain cases, the networks may establish dedicated tunnels (also referred to as "dedicated media tunnels" or "dedicated QoS tunnels") by which the QoS-sensitive services are delivered through the networks. Dedicated tunnels may ensure that the services are delivered through the networks at a particular QoS level. In a case of an Evolved Packet System (EPS), these dedicated tunnels may include dedicated bearers. In a case of a 5th Generation (5G) core network, the dedicated tunnels may include preestablished 5G QoS Indicator (5QI) data flows.

In situations in which a dedicated tunnel is sought through a core network and an IMS network, interruptions in the core network and/or the IMS network can prevent the dedicated tunnel from being established. In some cases, fallback to a Circuit-Switched (CS) network (e.g., a 2nd Generation (2G) network and/or a 3rd Generation (3G) network) can be initiated. In a CS fallback scenario, the initial call can be dropped and then a new call can be initiated over an available CS network, rather than the previous core network or IMS network.

However, CS networks are not always available. As more network providers begin to prioritize coverage for more advanced technologies, CS networks may become less accessible for CS fallback. In some cases, CS network coverage and/or CS network resources may be unavailable when a dedicated tunnel cannot be established through a 4th Generation (4G) or 5G network. In certain examples, CS network coverage is available, but restricted from use by the particular user or type of use associated with an attempt to access the CS network as a part of a fallback process.

When a dedicated tunnel cannot be established through a 4G or 5G network and CS fallback is unavailable, a device may be unable to receive QoS-sensitive services. In some examples, signaling between a caller and the core network may cause the caller to establish a voice call despite the lack of an established dedicated tunnel. However, because the dedicated tunnel has not been established, the caller may experience the call as a mute call. That is, the caller may be unable to receive voice services from the core network and the IMS network.

Moreover, this problem may persist in subsequent requests for services. For instance, a core network may save and reuse previously established connections in subsequent calls, even when there is a problem with one of the previously established connections. That is, the core network may reuse the same failed connection that prevented the establishment of the dedicated tunnel for the initial call. Accordingly, if the caller redials the same callee using the same core network, the caller will experience a mute call in an initial as well as subsequent calls with the callee. Although, in some cases, the core network may eventually diagnose and repair the offending connection (e.g., through a "self-restore" process), this process can take a significant amount of time. In the meantime, users of the caller and callee devices may be frustrated with the lack of services from the network.

In some cases, tech-savvy users may identify strategies for manually reestablishing (i.e., resetting) the connections through the core network and the IMS network, in order to avoid mute calls. In particular examples, a user may power cycle the caller device (e.g., turn a mobile phone off and on). In certain instances, a user may activate and de-activate "Airplane Mode" of the caller device. Both of these strategies may cause the core network and/or IMS network to "forget" existing connections setup with the core network and/or the IMS network, and to reestablish new network connections for the call. However, users that do not understand these tricks may be unable to avoid the cycle of mute calls due to interruptions associated with the IMS network. Moreover, even if a user understands these tricks, they require a high level of user intervention.

According to various implementations of the present disclosure, a network connection, which may be associated with a core network and/or IMS network, can be automatically reset when a dedicated tunnel has not been established for a particular session (e.g., a call) corresponding to services with a minimum QoS level. The network connection may be reset when CS fallback is unavailable, in some cases. In particular implementations, a caller (e.g., a UE) initiating the session can automatically cause the network connection to be reset when the caller does not receive a confirmation of the dedicated tunnel within a particular wait time. In some examples, the services include voice services and the session corresponds to a voice call.

According to certain implementations, the caller initiates a timer during Session Initiation Protocol (SIP) signaling. The timer may be initiated in response to transmitting or receiving a message (e.g., a SIP INVITE, a 100 Response, a Provisional Acknowledgement (PRACK) or the like) for setting up a first call corresponding to services with a minimum QoS level. In particular implementations, the caller can initiate the timer in response to receiving or transmitting at least one Session Description Protocol (SDP) message associated with setting up the first call.

If the timer expires without the caller having received, from the core network, a confirmation that the dedicated tunnel has been established, the caller may automatically cause the core network and/or an IMS network to reset at least one connection associated with the core network and/or the IMS network. In some cases, a connection between the core network and the IMS network may be reset. According to particular implementations, the UE may confirm that CS fallback is unavailable. The first call may end automatically or in response to user input. Subsequently, the caller may initiate a second call with the reset connection(s). Accordingly, the caller may successfully receive the QoS-sensitive services in the second call, despite a malfunctioning interface between the core network and the IMS network (or another interface associated with the core network and/or the IMS network) that was established for the first call and that would otherwise prevent the establishment of a dedicated tunnel. Further, the caller may successfully receive the QoS-sensitive services despite the unavailability of CS fallback. In addition, the QoS-sensitive services may be delivered to the caller without the device power cycling or cycling through airplane mode.

Particular implementations solve specific problems associated with telecommunication networks. Certain implementations enable successful delivery of QoS-sensitive services, even when a connection between a core network and an IMS network fails and/or even when a CS network is unavailable. In addition, particular implementations provide an improved user experience by ensuring that a device can successfully connect to a QoS session without requiring a user to manually power- or airplane-mode-cycle the device after the call initially fails. Accordingly, various implementations relate to specific improvements to various technical problems.

Particular implementations of the present disclosure will now be described with reference to the accompanying drawings.

Figure 1:
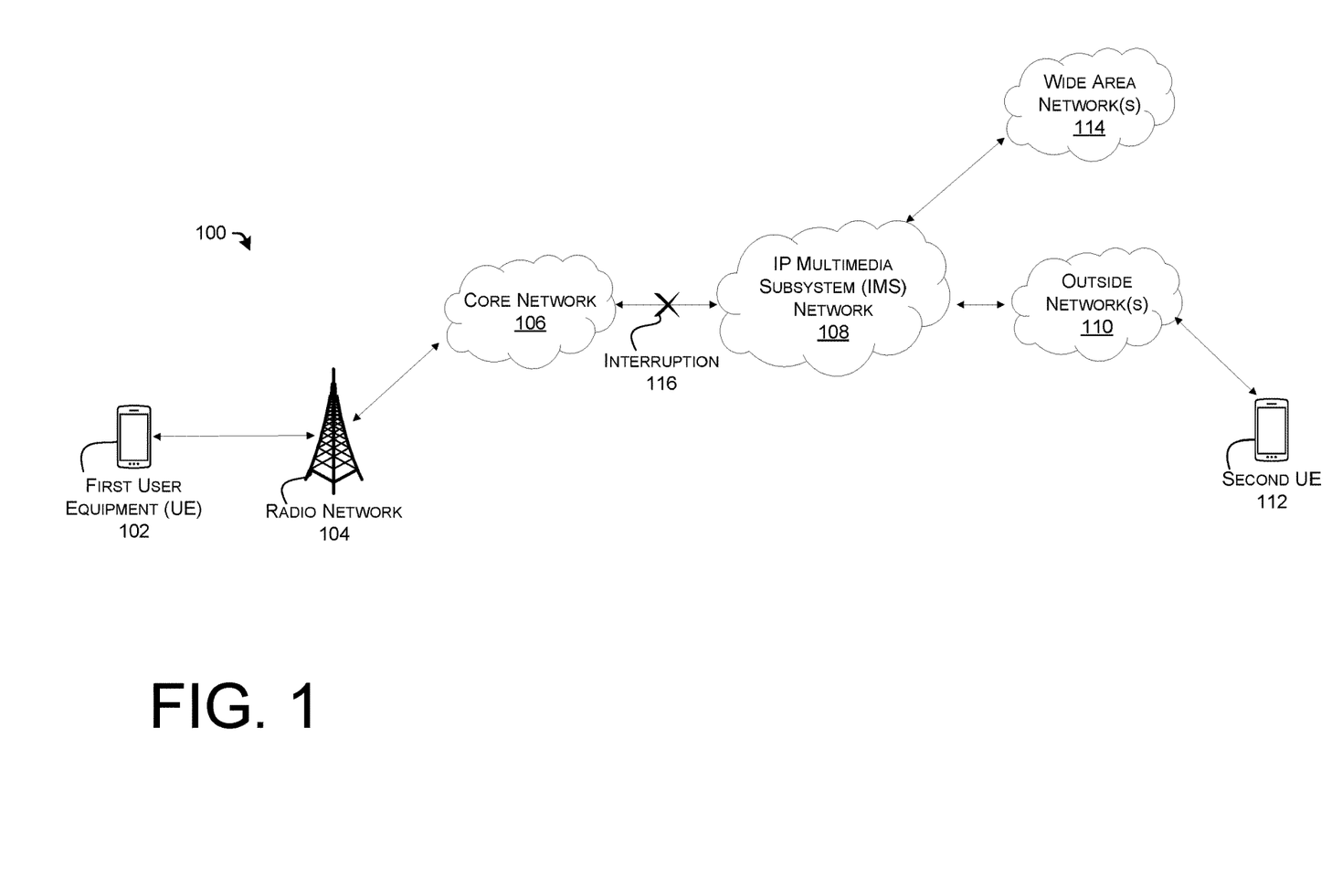
FIG. 1 illustrates an example network environment for automatically resetting a network connection using a wait time.

FIG. 1 illustrates an example network environment 100 for automatically resetting a network connection using a wait time.

A first User Equipment (UE) 102 may be connected to a radio network 104. In some implementations, the first UE 102 may be connected to the radio network 104 via a wireless interface. As used herein, the terms "UE," "user device," "wireless communication device," "wireless device," "communication device," "mobile device," and "client device," can be used interchangeably herein to describe any UE (e.g., the first UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over Internet Protocol (IP) (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future Internet Protocol (IP)-based network technology or evolution of an existing IP-based network technology.

In general, the first UE 102 can be implemented as any suitable type of computing device configured to communicate over a wired or wireless network, including, without limitation, a mobile phone (e.g., a smart phone), a tablet computer, a laptop computer, a Portable Digital Assistant (PDA), a wearable computer (e.g., electronic/smart glasses, a smart watch, fitness trackers, etc.), an Internet-of-Things (IoT) device, an in-vehicle (e.g., in-car) computer, and/or any similar mobile device, as well as situated computing devices including, without limitation, a television (smart television), a Set-Top-Box (STB), a desktop computer, and the like.

The first UE 102 may transmit and receive data wirelessly with the radio network 104 via one or more radio interfaces. The radio network 104 may be a Radio Access Network (RAN). In this manner, the radio network 104 can include and/or be substituted for a 3GPP RAN, such a GSM/EDGE RAN (GERAN), a Universal Terrestrial RAN (UTRAN), or an Evolved UTRAN (EUTRAN), or alternatively, via a "non-3GPP" RAN, such as a Wi-Fi RAN, or another type of wireless local area network (WLAN) that is based on the IEEE 802.11 standards. In some instances, the radio network 104 can include a Wi-Fi Access Point (AP). Although not illustrated, the environment 100 can further include any number and type of base stations representing any number and type of macrocells, microcells, picocells, or femtocells, for example, with any type or amount of overlapping coverage or mutually exclusive coverage compared to the radio network 104.

The radio network 104, in turn, may be connected to a core network 106. The core network 106 may be at least one of a 2nd Generation (2G) core network, a 3rd Generation (3G) core network, a 4th Generation (4G) core network, a 5th Generation (5G) core network, or the like. According to particular implementations, the core network 106 is a 4G core network, such as an Evolved Packet Core (EPC) network. In certain instances, various components of the EPC can include, but are not limited to, a Mobility Management Entity (MME), a Serving Gateway (SGW), a Packet Data Network (PDN) Gateway (PGW), a Home Subscriber Server (HSS), an Access Network Discovery and Selection Function (ANDSF), and/or an evolved Packet Data Gateway (ePDG). An SGW can include a component that handles user-plane data (SGW-U) and a component that handles control-plane data (SGW-C). A PDN can include a component that handles user-plane data (PDN-U) and a component that handles control-plane data (PDN-C). The core network may further include a Policy and Charging Rules Function (PCRF). Each entity, gateway, server, and function in the 4G core network can be implemented by specialized hardware (e.g., one or more devices), general hardware executing specialized software (e.g., at least one virtual machine executed on one or more devices), or the like.

In some examples, the core network 106 may be a 5G core network. Various components of a 5G core network can include, but are not limited to, a Network Exposure Function (NEF), a Network Resource Function (NRF), an Authentication Server Function (AUSF), an Access and Mobility management Function (AMF), a Policy Control Function (PCF), a Session Management Function (SMF), a Unified Data Management (UDM) function, a User Plane Function (UPF), and/or an Application Function (AF).

In general, the NEF can be implemented as a network function including functionality to securely expose services and/or capabilities provided by and amongst the various network functions, as discussed herein. In some instances, the NEF receives information from other network functions in the 5G core and can store the received information as structured data using an interface to a data storage network function.

In general, the AUSF can be implemented as a network function including functionality to provide authentication to various devices in the network. For example, the AUSF can request device credentials (e.g., security key(s)), verify that the first UE 102 is authorized to connect to a network, and/or control access to the network based on the device credentials.

In general, the NRF can be implemented as a network function including functionality to support service discovery (e.g., receive a network function discovery request and provide information associated with the discovered network function instances to a requesting entity). In some instances, the NRF can receive utilization information, capability information, etc. from various network functions, such as the UPF, to provide such utilization information to the other components discussed herein. Further, the NRF can select, assign, implement, or otherwise determine network functions to be used in a network based at least in part on utilization information, as discussed herein.

In general, the AMF can be implemented as a network function including functionality to provide UE-based authentication, authorization, mobility management, etc., to various UEs. In some instances, the AMF can include functionality to terminate a RAN control plane interface between the first UE 102 and other functions on the network. In some instances, the AMF can include functionality to perform registration management of the first UE 102 in the network, connection management, reachability management, mobility management, access authentication, access authorization, security anchor functionality (e.g., receiving and/or transmitting security keys during registration/authorization), and the like.

In general, the SMF can be implemented as a network function including functionality to manage communication sessions by and between UEs, and/or to provide IP addresses to the UEs. In some instances, the SMF can select a UPF to provide services to the first UE 102 in response to receiving a request for services from the first UE 102.

In general, the PCF can be implemented as a network function including functionality to support unified policy framework to govern network behavior, provide policy rules to control plane functions and/or enforce such rules, and/or implement a front end to access subscription information relevant for policy decisions in a data repository.

In general, the UDM can be implemented as a network function including functionality to process authentication credentials, handle user identification processing, manage registration and/or mobility, manage subscriptions between the first UE 102 and a carrier, and/or manage Short Message Service (SMS) data.

In general, the UPF can be implemented as a network function including functionality to control data transfer between the first UE 102 and the various components of the environment 100. In some instances, the UPF can include functionality to act as an anchor point for Radio Access Technology (RAT) handover (e.g., inter and intra), external Protocol Data Unit (PDU) session point of interconnect to an external network (e.g., the Internet), packet routing and forwarding, packet inspection and user plane portion of policy rule enforcement, traffic usage reporting, traffic routing, Quality of Service (QoS) handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be one or more UPFs, which are associated with the core network 106 and/or with the first UE 102

In general, the AF can be implemented as a network function including functionality to route traffic to/from applications operating on the network, facilitate accessing the NEF, and interact with the policy framework for policy control in connection with the PCF.

The core network 106 may be connected to an Internet Protocol (IP) Multimedia Subsystem (IMS) network 108. The IMS network 108 may be referred to an "IMS core network," or an "IMS CN Subsystem." IMS is an architectural framework defined by the 3rd Generation Partnership Project (3GPP) for delivering IP multimedia to a UE, such as the first UE 102. The IMS network 108 can be maintained and/or operated by one or more service providers, such as one or more wireless carriers ("carriers"), that provide IMS-based services to users who are associated with UEs, such as the first UE 102. For example, a service provider can offer multimedia telephony services that allow a user to call or message other users via the IMS network 108 using his/her UE. A user can also utilize an associated UE to receive, provide, or otherwise interact with various different IMS-based services by accessing the IMS network 108. It is to be appreciated that any number of base stations and/or nodes can be included in the IMS network 108.

Accordingly, an operator of the IMS network 108 can offer any type of IMS-based service, such as, telephony services, emergency services (e.g., E911), gaming services, instant messaging services, presence services, video conferencing services, social networking and sharing services, location-based services, push-to-talk services, and so on. In order for a UE (e.g., the first UE 102) to access these services (e.g., telephony services), the UE may be configured to request establishment of a communication session, or another UE (e.g., the second UE 114) may be configured to request establishment of the communication session. In the case of telephony services, the communication session can comprise a voice call (e.g., a voice-based communication session, such as a VoLTE call, or a Wi-Fi call), a video call, or the like.

The radio network 104, the core network 106, and/or the IMS network 108 may be managed by the same operator, in some cases. According to various implementations, the first UE 102 may be associated with a subscriber account corresponding to an operator of at least one of the radio network 104, the core network 106, or the IMS network 108.

The IMS network 108 may be connected to at least one outside network 110. The outside network(s) 110 may be used to connect the IMS network 108 to a second UE 112. In various implementations, services exchanged in a communication session between the first UE 102 and the second UE 112 may traverse the radio network 104, the core network 106, the IMS network 108, and the outside network(s) 110. In some cases, the outside network(s) 110 may include one or more outside IMS networks, one or more outside core networks, and/or one or more radio networks. The second UE 112 may be associated with a subscriber account corresponding to the outside network(s) 110. For instance, the second UE 112 may be associated with a subscriber account corresponding to a core network in the outside network(s) 110.

The IMS network 108 may also be connected to at least one Wide Area Network (WAN) 114, such as the Internet. In various implementations, various multimedia services can be provided to the first UE 102 from one or more content servers in the WAN 114 via a pathway through the radio network 104, the core network 106, and the IMS network 108.

In particular implementations, the first UE 102 may transmit a request, to the core network 106, for services associated with a particular Quality of Service (QoS) level. These services may be requested as part of a communication session with the second UE 112, for example. As used herein, the terms "communication session," "session," and their equivalents, can refer to an exchange of data between two or more communicating nodes or devices. A call (e.g., a voice call, a video call, or the like) may be an example of a communication session. A communication session can be temporary, such that it is established at a first time and ceased at a second time. In various implementations, a communication session includes the transfer of user plane data between two or more nodes. In some examples, a call can be established between a caller and a callee. In certain cases, a session can be established between a UE and a content server. According to particular implementations, a call may be supported by a dedicated tunnel over which the services are delivered in the call. As used herein, the term "caller," and its equivalents, can refer to a UE initiating a session. According to some implementations, the session may provide services to and from the caller. The session can be a communication session. In some cases, the caller may initiate a session with a callee. As used herein, the term "callee," and its equivalents, can refer to a UE receiving (and, in some cases, confirming) a request to participate in a communication session with a caller.

As used herein, the term "node," and its equivalents, can refer to one or more devices that transmit and/or receive data in a network. In some instances, a first node can transmit and/or receive data from a second node. For instance, a UE receiving services from an IMS network may be a node. In some cases, a UPF through which services are exchanged between an IMS network and a UE can also be a node.

The core network 106 may establish a pathway through the core network 106 and the IMS network 108 over which the services can be delivered to the first UE 102. As used herein, the terms "network path, "path," and their equivalents, can refer to a pathway over which data can be transferred between at least two terminal nodes or devices (e.g., a caller and a callee). In some cases, a path may include one or more intermediary nodes and/or one or more interfaces between the terminal nodes. In certain 4G core networks, the path may include at least one of an SGW, a PGW, or a PCRF over which the services are delivered. In certain 5G networks, the path may include at least one UPF over which the services are delivered.

In various implementations, the first UE 102 may register with the IMS network 108 via an IMS registration process. In some cases, the IMS registration process occurs in response to the initial request for services. In certain cases, the IMS registration process can occur prior to the first UE 102 transmitting the request for services. During the IMS registration process, a path between the core network 106 and the IMS network 108, by which the first UE 102 can be provided services, may be established. In particular, various interfaces associated with the core network 106 and/or the IMS network 108 can be allocated for multimedia services destined for or originating from the first UE 102. In various examples in which the core network 106 is an EPC, these interfaces can include, for instance, at least one of a Gx interface (e.g., an interface connecting the SGW or PGW to the PCRF), an Rx interface (e.g., an interface connecting the PCRF to the I/S-CSCF in the IMS network), an Sgi interface (e.g., an interface connecting the SGW or PGW to the P-CSCF in the IMS network), or the like. In certain examples in which the core network 106 is a 5G core network, these interfaces can include an N5 interface between the UPF and the IMS network 108.

The core network 106 may also identify that a dedicated tunnel should be established through the core network 106 and the IMS network 108 for the services requested by the first UE 102. In some cases, the first UE 102 may identify that the services are associated with the particular QoS level. As used herein, the term "QoS level," and its equivalents, can refer to at least one required (e.g., a minimum or maximum) metric associated with a type of QoS-sensitive data traffic. In a 3GPP LTE network, the QoS level may be associated with a QoS Class Identifier (QCI). In some 5G core networks, the QoS level may be associated with a 5G QoS Identifier (5QI). A type of services or data traffic associated with a minimum QoS level may be referred to as "QoS-sensitive." In various implementations, a QoS level can correspond to at least one of a priority of the services as they are transmitted through a delivery network (e.g., as compared to other services transmitted through the core network 106, the IMS network 108, or a combination thereof), a maximum packet delay budget of the services (e.g., maximum allowable delay(s) by one or more nodes and/or interfaces through the delivery network), or a maximum packet error loss rate of the services (e.g., a maximum rate of bit errors added to bits in data packets comprising the services after they are transmitted through the delivery network).

According to particular implementations, a QoS level may be associated with at least one of a priority of the type of data traffic through one or more networks, a maximum packet delay budget of the type of data traffic, a maximum packet delay budget of the type of data traffic, a Guaranteed Bit Rate (GBR) of the type of data traffic, or the like. A minimum QoS level may correspond to a minimal standard of QoS over which the network guarantees the services to be delivered. The minimum QoS level may be predetermined. In certain implementations, a type of data traffic associated with a particular (e.g., a minimum) QoS level is delivered across one or more networks (e.g., a core network and/or an IMS network) via a dedicated tunnel. As used herein, the term "GBR," and its equivalents, can refer to a type of data traffic that may be transferred through at least one network by at least a minimum bit rate. In some cases, GBR data traffic corresponds to the type of services associated with the data traffic. According to 3GPP specifications, examples of GBR services can include conversational voice, conversational video (e.g., live streaming), real-time gaming, certain V2X messaging, non-conversational video (e.g., buffered streaming), mission critical user plane Push to Talk (PTT) voice, certain Mission Critical user plane Push to Talk Voice (MCPTT), non-mission-critical user plane, or the like. However, for the purposes of this disclosure, GBR services can include any predefined set of services that are sensitive to network delays and/or any other services that should be prioritized by at least one network (e.g., the radio network 104, the core network 106, and/or the IMS network 108) delivering the services.

In certain examples, the core network 106 may identify that the services are associated with the particular QoS level. The core network 106 may attempt to establish the dedicated tunnel based on the particular QoS level. As used herein, the term "dedicated tunnel," and its equivalents, can refer to at least one of (i) a pathway through at least one network or (ii) reserved resources allocated to a particular session traversing the network(s). A dedicated tunnel may be established through nodes in one or more of the radio network 104, the core network 106, and the IMS network 108. In particular implementations disclosed herein, the core network 106 may attempt to establish the dedicated tunnel through the core network 106 and the IMS network 108. According to some examples, a dedicated tunnel may refer to a dedicated bearer (e.g., for data traffic traversing an EPC), a dedicated 5QI flow (e.g., for data traffic traversing a 5G core network), or the like.

In particular implementations in which the core network 106 includes an EPC, the EPC may establish a dedicated bearer in response to determining that a caller (e.g., the first UE 102) is requesting QoS-sensitive services. The PCRF may transmit, to the PGW, an indication of one or more QoS rules indicating that the dedicated bearer is required. In some cases, the PCRF may transmit the indication in response to receiving, from the caller, a UE-initiated resource request corresponding to the dedicated bearer. The PGW may transmit, to the MME, a request to create the dedicated bearer (e.g., a Create Dedicated Bearer Request). The MME may send, to a corresponding EUTRAN (e.g., the radio network 104), a request to establish a radio bearer to support the dedicated bearer. The MME can transmit, to the SGW, a message (e.g., a Create Dedicated Bearer Response, EPS Bearer Identity, S1-TEID, etc.) acknowledging that the dedicated bearer has been established in the EPC.

In particular implementations in which the core network 106 includes a 5G core network, the 5G core network can establish a 5QI flow in a manner similar to the EPC establishing the dedicated tunnel, wherein various functions within the 5G core network can be substituted for various elements in the EPC. For instance, the AMF can perform at least some of the functions of the MME, the SMF can perform at least some of the control plane functions of the SGW, the UPF can perform at least some of the user plane functions of the SGW, the PCF can perform at least some of the functions of the PCRF, and the like. data flow for the delivery of the QoS-sensitive services for the first UE 102.

The process of establishing the dedicated tunnel may also include signaling over one or more of the interfaces established via the IMS registration process. For instance, the core network 106 may transmit a message requesting the dedicated tunnel to the IMS network 108 and/or the IMS network 108 and may transmit a message confirming establishment of the dedicated tunnel through the IMS network 108. In particular examples in which the core network 106 is an EPC, the signaling can be transferred over at least one of the Gx interface, the Rx interface, the Sgi interface, or the like. In some examples in which the core network 106 is a 5G core network, the signaling can be transferred over an N5 interface between the UPF and the IMS network 108. In various implementations, to successfully establish the dedicated tunnel, these interfaces should be intact.

In some cases, at least one component of the IMS network 108 is also responsible for setting up a dedicated tunnel. In some cases, the core network 106 can transmit, to the IMS network 108, a dedicated tunnel request. In particular cases of a 4G core network, an AF in the IMS network 108 may transmit, to a PCRF in the core network 106, an indication of one or more characteristics of a dedicated bearer. The PCRF, in turn, can cause the rest of the core network 106 to set up the dedicated bearer. The AF may transmit the indication by transmitting a Diameter Authenticate-Authorize-Request (AAR) message to the PCRF over an Rx interface. In particular cases of a 5G core network, various components of the 5G core network can interact with the IMS network 108 similarly to components of the 4G core network. For instance, the PCF can perform at least some of the functions of the PCRF.

Simultaneously while the core network 106 attempts to establish the dedicated tunnel through the core network 106 and the IMS network 108, in some cases, the first UE 102 and the core network 106 may continue to exchange signaling to set up the communication session. For instance, the first UE 102 and the core network 106 may exchange multiple Session Initiation Protocol (SIP) messages and/or Session Description Protocol (SDP) messages. As a result of the signaling exchanged between the first UE 102 and the core network 106, the communication session may be established. In the case of a voice call, the first UE 102 may transition from a "ringing" state to an established call state.

However, in particular implementations, the dedicated tunnel may not be established successfully due to an interruption 116 in at least one interface associated with the core network 106 and/or the IMS network 108. In certain examples, the interruption 116 can occur at a connection between the core network 106 and the IMS network 108. In some implementations in which the core network 106 is an EPC, the interruption 116 can occur at one of various interfaces, such as Gx interface, the Rx interface, the Sgi interface, or the like. In some implementations in which the core network 106 is a 5G core network, the interruption 116 can occur at the N5 interface. In some cases, the interruption 116 can occur at some other Nx interface associated with the 5G network.

Without the dedicated tunnel being established, the first UE 102 may not receive the services associated with the communication session. For example, in the case of a voice call, the first UE 102 may experience a mute call. That is, the first UE 102 may be in the established call state with the second UE 114, but the first UE 102 may not receive signals indicating voice services from the second UE 114.

In some cases, when the first UE 102 attempts to reestablish the communication session (e.g., redials the second UE 114), the first UE 102 will also experience a subsequent mute call. This is because, without further intervention, the core network 106 and the IMS network 108 may continue to attempt to establish a dedicated tunnel by reusing the existing connections that have already been established and/or allocated for the first UE 102 in the IMS registration process. For example, if the interruption 116 is in the Rx interface, the core network 106 may reuse the interrupted Rx interface in setting up subsequent communication sessions between the first UE 102 and the second UE 114. In some cases, the connection with the interruption 116 may be eventually restored by the core network 106. However, this process can take a significant amount of time.

If a new IMS registration process is performed after the failed establishment of the dedicated tunnel, the core network 106 and the IMS network 108 may establish and/or allocate new connections by which services can be delivered to the first UE 102. The new connections may omit the interruption 116. Accordingly, the dedicated tunnel can be successfully established for subsequent communication sessions associated with the first UE 102.

In various implementations of the present disclosure, the first UE 102 may cause the core network 106 and/or the IMS network 108 to reset the connection with the interruption 116, and thereby enable establishment of the dedicated tunnel. In particular examples, the first UE 102 may initiate a timer in response to receiving and/or transmitting a signal with the core network 106. For example, the first UE 102 may initiate the timer in response to transmitting an initial SIP INVITE requesting the services to the core network 106. The timer may be count down a wait time. As used herein, the term "wait time," and its equivalents, can refer to a time interval by which a device waits before causing a connection associated with at least one network to be reset. In various implementations, a wait time can be predetermined. In some cases, a length of the wait time can depend on various temporary conditions of an associated network (e.g., a congestion level in the core network 106 and/or the IMS network 108). In some cases, the wait time can be between about 1 second and about 1 minute. In particular implementations, the wait time can be between about 5 seconds and about 30 seconds. In specific examples, the wait time may be about 12 seconds. As used herein, the term "about" can refer to a range of ±10% of an applicable base value. For example, "about 1" can refer to a range of 0.9 to 1.1, inclusive.

In certain instances, the timer can be stopped prematurely (i.e., before the wait time expires) by the first UE 102. For example, the timer can be stopped when the first UE 102 receives a 18X response (e.g., a 180 Ringing message, a 181 Call is Being Forwarded message, a 182 Queued message, a 183 Session Progress message, etc.). The 18X message may not require a precondition. In some cases, the first UE 102 can stop the timer upon receiving a Non-Access Stratum (NAS) voice dedicated bearer setup request or an NAS voice QoS flow request. The first UE 102 may stop the timer when the first UE 102 receives a message indicating context of an established dedicated tunnel. In certain instances, the first UE 102 may stop the timer when it receives an Activate Dedicated EPS Bearer Context request for voice. In some cases applicable to 5G networks, the first UE 102 may stop the timer in response to receiving a Protocol Data Unit (PDU) Session Modification Command from the core network 106. In some cases, the first UE 102 may stop the timer when the communication session is terminated. When the timer is stopped prematurely, the timer is no longer applicable to the communication session.

In particular implementations, the timer (i.e., the wait time) may expire without the first UE 102 having received a confirmation that the dedicated tunnel has been established. For example, the confirmation may correspond to information indicating a context for the dedicated tunnel. The failure to receive the confirmation within the wait time may indicate, to the first UE 102, that the dedicated tunnel was not established for the communication session. In certain cases, the communication session may subsequently end. For instance, the first UE 102 may receive an input from a user to hang up the mute voice call. In certain examples, the first UE 102 may automatically end the communication session.

The first UE 102 may cause (e.g., instruct) the core network 106 to reestablish (i.e., reset) the connection with the interruption 116. For example, the first UE 102 may instruct the core network 106 to perform another IMS registration process for the first UE 102. The IMS re-registration process may cause the connection with the interruption 116 to be reset. In some instances, the first UE 102 may cause the core network 106 to selectively identify and reestablish the connection with the interruption 116. Accordingly, in some cases, IMS re-registration may be unnecessary to reset the connection with the interruption 116. Any of these processes can occur automatically (i.e., without prompting by a user).

The core network 106, in response, may reestablish one or more connections associated with the core network 106 and/or the IMS network 108. In particular, at least one connection between the core network 106 and the IMS network 108 may be reset. The connection(s) may include, for instance, LTE a connection between P/S-GW and PCF when the core network 106 is an EPC or between the SMF and the PCF when the core network 106 is a 5G core network. Accordingly, the connections used by the core network 106 and the IMS network 108 to establish a dedicated tunnel for the first UE 102 may be intact, and may not include the interruption 116.

The first UE 102 may initiate another communication session for the same service using the reestablished connection. In some examples, the first UE 102 may redial the second UE 112 in order to reestablish the voice call with the second UE 112. In some cases, this process can also occur automatically (i.e., without user intervention).

As a result of the absence of the interruption 116, the dedicated tunnel can be successfully established for the communication session. The first UE 102 may receive the information indicating the context of an established dedicated tunnel and also receive the requested services via the established dedicated tunnel. The dedicated tunnel may be established, and the first UE 102 may receive the QoS-sensitive services, without requiring the first UE 102 to power cycle and/or cycle through airplane mode. Accordingly, the first UE 102 can efficiently receive the QoS-sensitive services over a dedicated tunnel, despite the interruption 116 in the initially established pathway through the core network 106 and the IMS network 108.

Figure 2A:
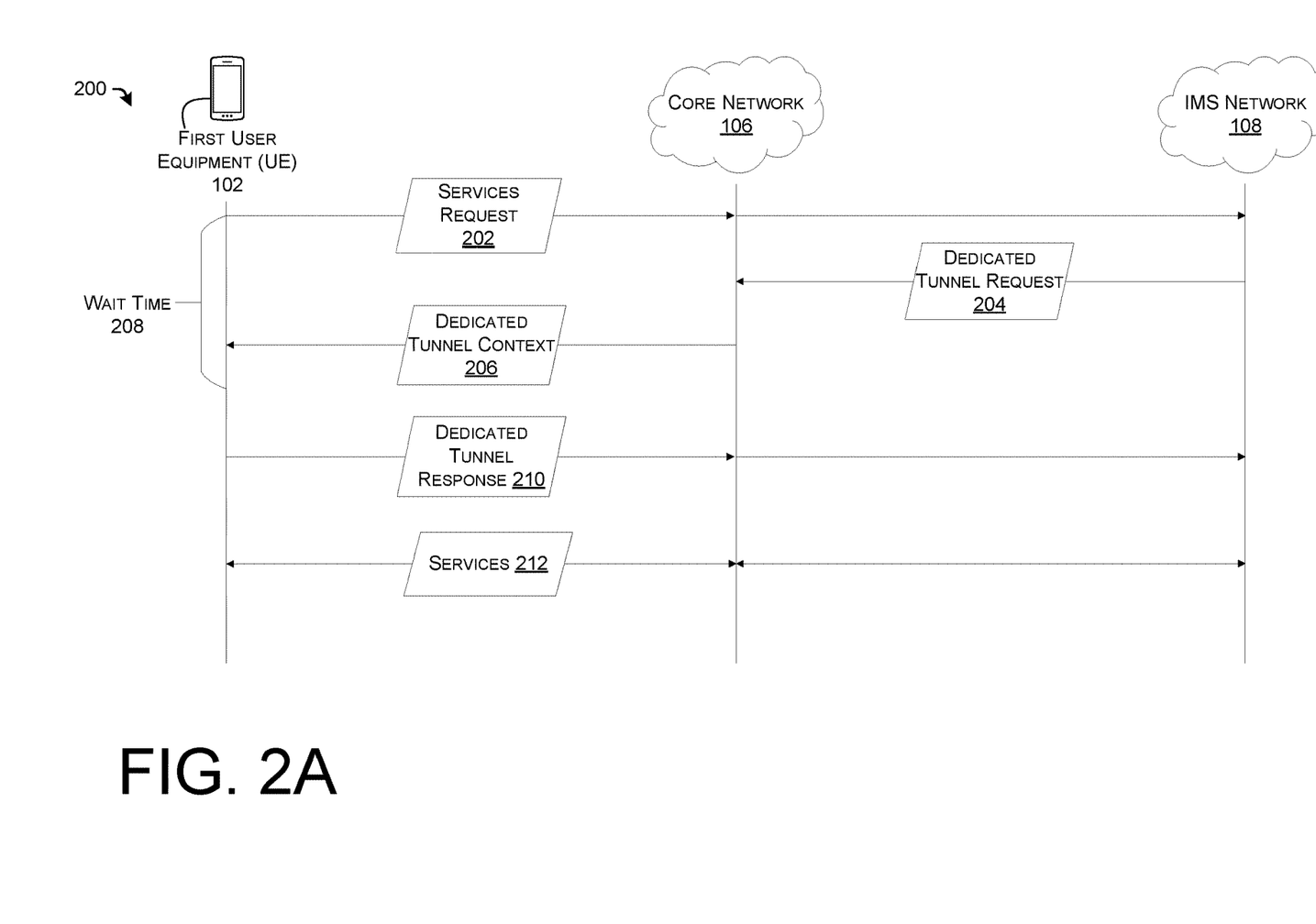
FIG. 2A illustrates example signaling for establishing a session via a dedicated tunnel when a confirmation that the dedicated tunnel has been established is received within a wait time.

FIG. 2A illustrates example signaling 200 for establishing a session via a dedicated tunnel when context information for the dedicated tunnel is received within a wait time. The signaling 200 may be performed by the first User Equipment (UE) 102, the core network 106, and the Internet Protocol (IP) Media Subsystem (IMS) network 108 described above with reference to FIG. 1. Although not illustrated in FIG. 2A, various networks and/or nodes may be present between the first UE 102, the core network 106, and the IMS network 108. For example, the radio network 104 may be disposed between the first UE 102 and the core network 106, such that at least some signaling between the first UE 102 and the core network 106 may traverse the radio network 104.

The first UE 102 may transmit a services request 202 to the core network 106. In particular implementations, the services request 202 includes at least one Session Initiation Protocol (SIP) message, at least one Session Description Protocol (SDP) message, or a combination thereof. For instance, the services request 202 may be a SIP INVITE message. In some cases, the services request 202 can be a Provisional Acknowledgement (PRACK) message. The services request 202 may identify the type of services being requested by the first UE 102. In some cases, the services request 202 may identify a particular Quality of Service (QoS) level of the requested services. The services request 202, in some cases, may identify that a dedicated tunnel should be established for delivery of the services. In certain implementations, the core network 106 may identify that the dedicated tunnel should be established for delivery of the services based on the services request 202.

The core network 106 may forward at least a portion of the services request 202 to the IMS network 108. An interface between the core network 106 and the IMS network 108 may be intact. Accordingly, the IMS network 108 may receive the services request 202 from the core network 106. In response to receiving the services request 202, the IMS network 108 may initiate establishment of the dedicated tunnel through the IMS network 108.

The IMS network 108 may transmit a dedicated tunnel request 204 to the core network 106. The dedicated tunnel request 204 may indicate the portion of the dedicated tunnel that has been established through the IMS network 108. In some cases, the dedicated tunnel request 204 may further include a request for the core network 106 to establish a portion of the dedicated tunnel.

In response to receiving the dedicated tunnel request 204, the core network 106 may transmit a dedicated tunnel context message 206 to the first UE 102. The dedicated tunnel context message 206 may indicate, to the first UE 102, that the dedicated tunnel has been established through the core network 106 and/or the IMS network 108. In some cases, another message indicating that the dedicated tunnel has been established may be transmitted from the core network 106 to the first UE 102. In various implementations, the first UE 102 may receive a message (e.g., a confirmation) confirming that the dedicated tunnel has been established.

The first UE 102 may receive the dedicated tunnel context message 206 prior to a wait time 208 expiring. As illustrated in FIG. 2A, the wait time 208 may begin in response to the first UE 102 transmitting the services request 202 to the core network 106. However, implementations are not limited thereto. Because the first UE 102 receives the dedicated tunnel context message 206, the first UE 102 may be aware that the dedicated tunnel has been established before the expiration of the wait time 208.

Subsequently, the first UE 102 may transmit a dedicated tunnel response 210 to the core network 106, which may be at least partially forwarded to the IMS network 108. The dedicated tunnel response 210 may indicate, to the core network 106 and the IMS network 108, that the first UE 102 has received the dedicated tunnel context message 206. In some cases, the dedicated tunnel response 210 may activate the established dedicated tunnel in the core network 106 and/or the IMS network 108.

The first UE 102 may subsequently exchange the services 212 with another entity (e.g., a content server associated with the WAN 114, the second UE 112, or the like) via the dedicated tunnel. The services 212 may be delivered to the first UE 102 by a QoS level guaranteed by the dedicated tunnel.

Figure 2B:
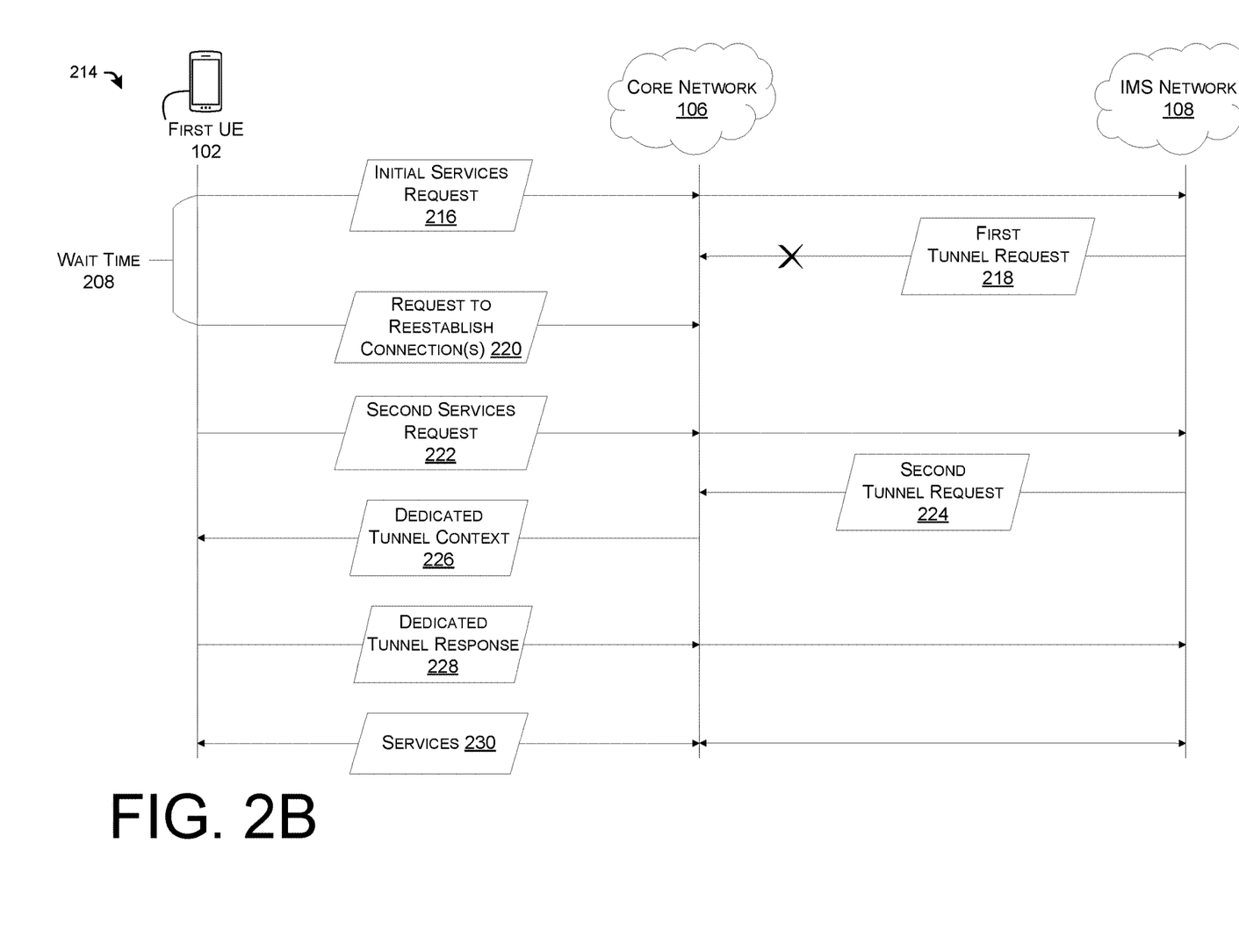
FIG. 2B illustrates example signaling for resetting a network connection when a confirmation that a dedicated tunnel is not received within a wait time, and for establishing a session via a dedicated tunnel that utilizes the reset network connection.

FIG. 2B illustrates example signaling 214 for resetting a network connection when context information for a dedicated tunnel is not received within a wait time, and for establishing a session via a dedicated tunnel that utilizes the reset network connection. The signaling 214 may be performed by the first User Equipment (UE) 102, the core network 106, and the Internet Protocol (IP) Media Subsystem (IMS) network 108 described above with reference to FIG. 1. Although not illustrated in FIG. 2B, various networks and/or nodes may be present between the first UE 102, the core network 106, and the IMS network 108. For example, the radio network 104 may be disposed between the first UE 102 and the core network 106, such that at least some signaling between the first UE 102 and the core network 106 may traverse the radio network 104.

The first UE 102 may transmit an initial services request 216 to the core network. In particular implementations, the initial services request 216 includes at least one Session Initiation Protocol (SIP) message, at least one Session Description Protocol (SDP) message, or a combination thereof. For instance, the initial services request 216 may be a SIP INVITE message. In some cases, the initial services request 216 can be a Provisional Acknowledgement (PRACK) message. The initial services request 216 may identify the type of services being requested by the first UE 102. In some cases, the initial services request 216 may identify a particular Quality of Service (QoS) level of the requested services. The initial services request 216, in some cases, may identify that a dedicated tunnel should be established for delivery of the services. In certain implementations, the core network 106 may identify that the dedicated tunnel should be established for delivery of the services based on the services request 202.

The core network 106 may forward at least a portion of the initial services request 216 to the IMS network 108. In response to receiving the initial services request 216, the IMS network 108 may attempt to transmit a first tunnel request 218 to the core network 106 over an interface between the IMS network 108 and the core network 106. However, the interface between the core network 106 and the IMS network 108 may be interrupted. For instance, the interface between the core network 106 and the IMS network 108 may be misconfigured, out-of-sync, or otherwise down. Accordingly, the core network 106 may not receive the first tunnel request 218 from the IMS network 108. As a result, the core network 106 may not be triggered to establish a dedicated tunnel, may be unaware of any portion of the dedicated tunnel established in the IMS network 108, and may not provide the first UE 102 with context information about a dedicated tunnel by which the requested services can be delivered.

Although not illustrated in FIG. 2B, in some implementations, an interface over which the core network 106 attempts to transmit the portion of the initial services request 216 to the IMS network 108 may be interrupted. Accordingly, in these implementations, the IMS network 108 may not receive the initial services request 216. As a result, the IMS network 108 may not be triggered to transmit, or may have no way of transmitting, the first tunnel request 218 to the core network 106.

In any case, the wait time 208, which the first UE 102 may be tracking since the transmission of the initial services request 216, may expire without the first UE 102 having received a confirmation that an appropriate dedicated tunnel has been established in the core network 106 and/or the IMS network 108, such as information indicating a context of a dedicated tunnel for the requested services. In response to the wait time 208 expiring, the first UE 102 may transmit, to the core network 106, a request to reestablish at least one connection 220.

In response to receiving the request to reestablish connection(s) 220, the core network 106 may reset one or more connections associated with the core network 106 and/or the IMS network 108. In particular, the core network 106 may reestablish a connection between the core network 106 and the IMS network 108. Accordingly, the previous interruption between the core network 106 and the IMS network 108, which prevented the initial services request 218 from reaching the IMS network 108, can be resolved. In some implementations, the core network 106 may perform an initial IMS registration process, thereby reestablishing multiple connections throughout and between the core network 106 and the IMS network 108.

In some cases, the first UE 102 may also transmit, to the core network 106, a second services request 222, which requests the same or similar services as those requested in the initial services request 216. In some cases, the request to reestablish the connection(s) 220 may include the second services request 222.

The core network 106 may transmit the second services request 222 to the IMS network 108. In response to receiving the second services request 222, the IMS network 108 may initiate the establishment of at least a portion of the dedicated tunnel through the IMS network 108.

The IMS network 108 may transmit a second tunnel request 224 to the core network 106. The second tunnel request 224 may indicate the portion of the dedicated tunnel that has been established through the IMS network 108 and/or may request the core network 106 to establish a portion of the dedicated tunnel through the core network 106.

In particular implementations, because the reestablished interface between the core network 106 and the IMS network 108 may be intact, the second services request 222 may successfully be transmitted from the core network 106 to the IMS network 108. Accordingly, the IMS network 108 may receive the second services request 222 from the core network 106. In some cases, the core network 106 may successfully receive the second tunnel request 224 from the IMS network 108 over the reestablished interface.

In response to receiving the second tunnel request 224, the core network 106 may transmit a dedicated tunnel context message 226 to the first UE 102. The dedicated tunnel context message 226 may indicate, to the first UE 102, that the dedicated tunnel has been established. In some cases, the first UE 102 may identify that the dedicated tunnel has been established by receiving some other type of message from the core network 106.

Subsequently, the first UE 102 may transmit a dedicated tunnel response 228 to the core network 106, which may be at least partially forwarded to the IMS network 108. The dedicated tunnel response 228 may indicate, to the core network 106 and the IMS network 108, that the first UE 102 has received the dedicated tunnel context message 226. In some cases, the dedicated tunnel response 228 may activate the established dedicated tunnel in the core network 106 and/or the IMS network 108.

The first UE 102 may subsequently exchange services 230 with another entity (e.g., a content server associated with the WAN 114, the second UE 112, or the like) via the dedicated tunnel. The services 230 may be delivered to the first UE 102 by a QoS level guaranteed by the dedicated tunnel.

Although FIG. 2B depicts a scenario in which a connection between the core network 106 and the IMS network 108 is intact when the core network 106 transmits the initial services request 216 to the IMS network 108, implementations are not so limited. In some cases, the initial services request 216 may be transmitted from the core network 106 over an interrupted connection. In various examples, an interrupted connection within the core network 106 may prevent the core network 106 from establishing the dedicated tunnel, an interrupted connection within the IMS network 108 may prevent the IMS network 108 from establishing the dedicated tunnel, or the like. In various implementations, for various reasons, the first UE 102 may not receive a confirmation that the dedicated tunnel has been established within the wait time 208.

Figure 3:
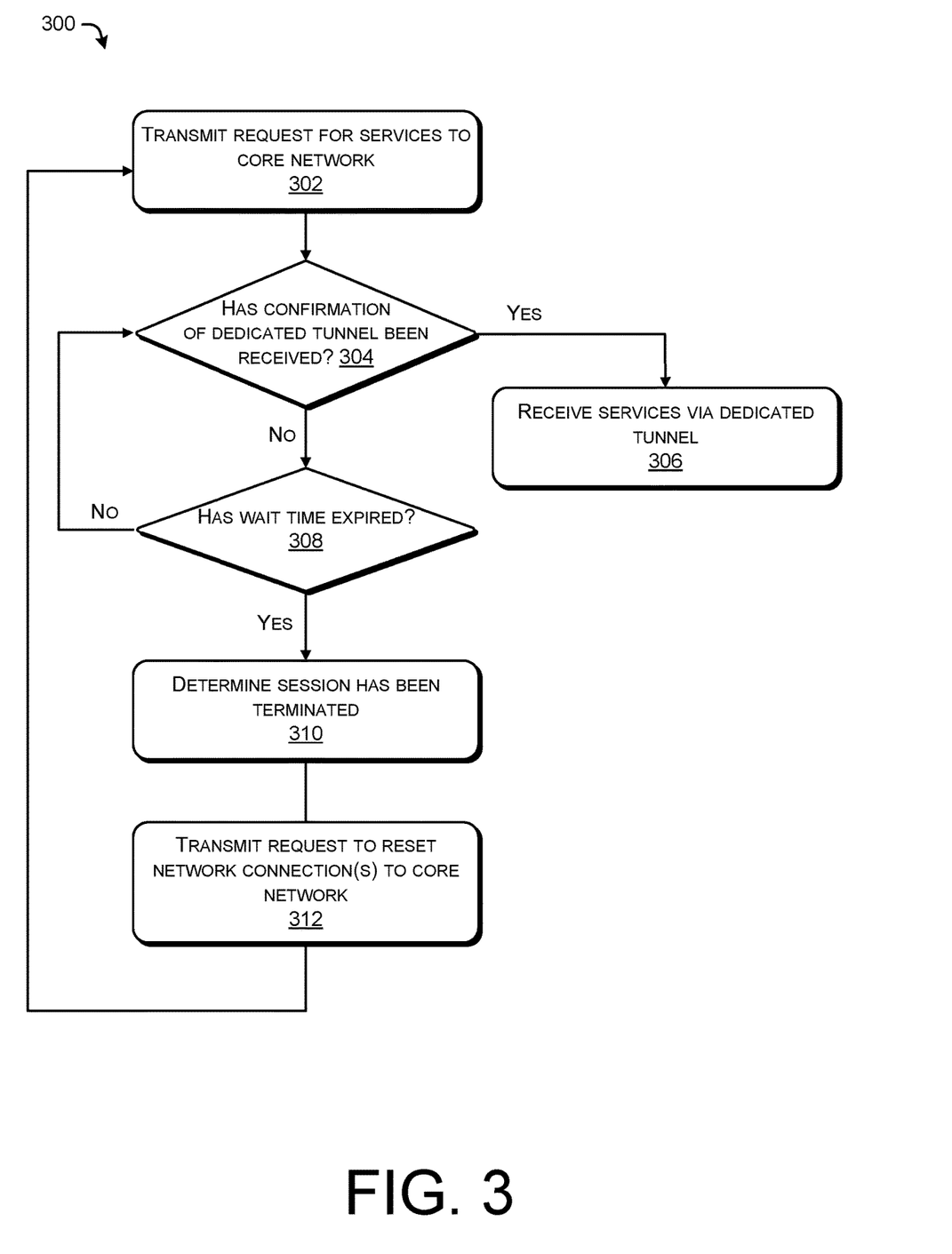
FIG. 3 illustrates an example recursive process for resetting a network connection using a wait time.
Figure 4:
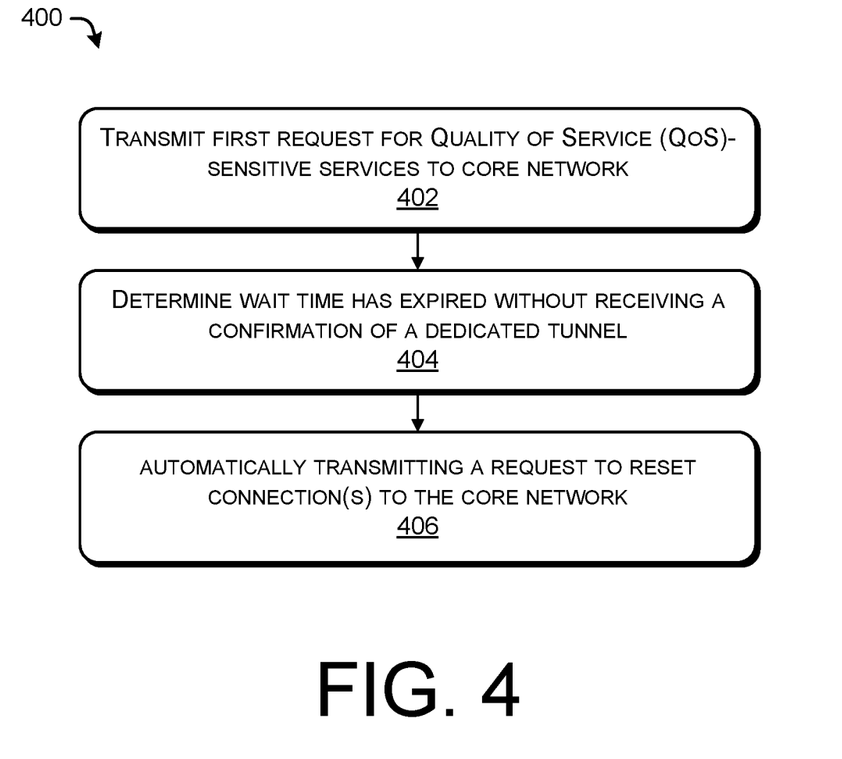
FIG. 4 illustrates an example process for automatically resetting a network connection using a wait time.

FIGS. 3 and 4 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example recursive process 300 for resetting a network connection using a wait time by retransmitting a services request to a core network. In various implementations, the process 300 can be performed by a User Equipment (UE), such as the first UE 102 described above with reference to FIGS. 1 to 2B.

At 302, a request for services can be transmitted to a core network 302. In some implementations, the request includes at least one of a Session Initiation Protocol (SIP) message or a Session Description Protocol (SDP) message. In particular examples, the request can be a SIP INVITE message, a Provisional Acknowledgement (PRACK) message, or the like. For instance, the request may be a request to initiate a session that involves the delivery and/or exchange of the services by the entity performing the process 300.

The services may be Quality of Service (QoS)-sensitive services that are associated with a minimum QoS level. In particular implementations, the request can be for Guaranteed Bit Rate (GBR) services. For instance, the services may be voice services. In various implementations, the requested services may be pre-associated with a dedicated tunnel. For example, the type of requested services may be pre-associated with a dedicated bearer, a dedicated 5th Generation (5G) QoS Indicator (5QI) data flow, or the like. In various implementations, the request 302 may cause the core network and/or an Internet Protocol (IP) Multimedia Subsystem (IMS) network connected to the core network to at least attempt to establish the dedicated tunnel through the core network and the IMS network.

In various implementations, the core network can be a 4th Generation (4G) core network, a 5th Generation (5G) core network, or a combination thereof. In some instances, a Circuit-Switched (CS) network may be unavailable to the device performing the process 300. The request may be transmitted to the core network via a Radio Access Network (RAN), in particular examples.

At 304, the process includes determining whether a confirmation of a dedicated tunnel has been received. In some implementations, the core network may establish a suitable dedicated tunnel corresponding to the requested services and confirm that the dedicated tunnel has been established by providing at least one message to the entity performing the process 300. For example, the entity performing the process 300 may receive information indicating a context of the dedicated tunnel.

If the confirmation is determined to have been received at 304, the process 300 proceeds to 306. At 306, the requested services are received via the established dedicated tunnel. Accordingly, the services may be delivered via a minimum QoS level corresponding to the established dedicated tunnel.

On the other hand, if the confirmation is determined to have not been received at 306, the process 300 proceeds to 308. At 308, the process 300 includes determining whether a wait time has expired. In some cases, the wait time may begin when the request is transmitted at 302. In certain examples, the wait time may begin when a message (e.g., a 18X response message, an Acknowledgement (ACK) message, or the like) is received from the core network in response to the request. According to various implementations, a length of the wait time can be between about 5 seconds to about 30 seconds. For example, the wait time can be about 12 seconds If the wait time is determined to have not expired at 308, the process 300 returns to 306. However, if the wait time is determined to have expired at 308, the process 300 proceeds to 310. At 310, the session is determined to have been terminated. In some examples, the session is automatically terminated by the entity performing the process 300. For instance, if the session is a voice call, the voice call may be dropped. In some instances, the session is terminated in response to a user input. For example, in the case of a voice call, a user may "hang up" the call.

At 312, a request to reset one or more network connections is transmitted to the core network. In various implementations, the network connection(s) may be reset in response to the request at 312. The network connection(s) may include at least one network connection that was interrupted or otherwise malfunctioning, and that prevented the establishment of the dedicated tunnel through the core network and/or the IMS network. The network connection(s) may be in the core network, in the IMS network, or between the core network and the IMS network. In the case of a 4G core network, the network connection(s) may include at least one of a Gx interface, an Rx interface, or an SGi interface. In the case of a 5G core network, the network connection(s) may include an N5 interface. Accordingly, by causing the network connection(s) to be reset. In some instances, 314 includes initiating an IMS registration process, such that multiple network connections associated with the core network and/or the IMS network are reset.

After 314, the process 300 returns back to 302. If the interrupted network connection(s) are reset in response to the request transmitted at 312, a dedicated tunnel may be successfully established using the reset network connection(s) in a subsequent cycle of the process 300. Accordingly, even if the services were not successfully received in an initial cycle of the process 300, the services may be received in a subsequent cycle of the process 300.

FIG. 4 illustrates an example process 400 for automatically resetting a network connection using a wait time. In various implementations, the process 300 can be performed by a User Equipment (UE), such as the first UE 102 described above with reference to FIGS. 1 to 2B.

At 402, a request for Quality of Service (QoS)-sensitive services is transmitted to a core network. In some implementations, the request includes at least one of a Session Initiation Protocol (SIP) message or a Session Description Protocol (SDP) message. In particular examples, the request can be a SIP INVITE message. The request may initiate a session.

The QoS-sensitive services may be associated with a minimum QoS level. In particular implementations, the request can be for Guaranteed Bit Rate (GBR) services. For instance, the services may be voice services. In various implementations, the requested services may be pre-associated with a dedicated tunnel. For example, the type of requested services may be pre-associated with a dedicated bearer, a dedicated 5th Generation (5G) QoS Indicator (5QI) data flow, or the like.

In various implementations, the core network can be a 4th Generation (4G) core network, a 5th Generation (5G) core network, or a combination thereof. In some instances, a Circuit-Switched (CS) network may be unavailable to the device performing the process 300. The request may be transmitted to the core network via a Radio Access Network (RAN), in particular examples.

At 404, a wait time is determined to have expired without having received a confirmation of the dedicated tunnel. In some cases, the wait time may begin when the request is transmitted at 402. In certain examples, the wait time may begin when a message (e.g., a Provisional Acknowledgement (PRACK) message) is received from the core network in response to the request. According to various implementations, a length of the wait time can be between about 5 seconds to about 30 seconds. For example, the wait time can be about 12 seconds.

In some implementations, the core network may attempt to establish a suitable dedicated tunnel corresponding to the requested QoS-sensitive services and confirm that the dedicated tunnel has been established by providing at least one message to the entity performing the process 300. However, in various implementations, an interruption at a connection (e.g., at least one of a Gx interface, an Rx interface, an Sgi interface, or an N4 interface) associated with a core network or an Internet Protocol (IP) Multimedia Subsystem (IMS) network may prevent the dedicated tunnel from being established in a timely manner. The dedicated tunnel may fail to be established through the core network and the IMS network, and core network may fail to transmit information indicating a context of an established dedicated bearer, in various examples.

At 406, a request to reestablish one or more connections is automatically transmitted to the core network. The request may cause the core network to reset the connection(s). The connection(s) may include the interrupted connection that prevented the establishment of the dedicated tunnel. For example, the connection(s) may include at least one of a Gx interface, an Rx interface, an SGi interface, or an N4 interface associated with the core network and/or the IMS network. In some cases, multiple connections associated with the core network and/or the IMS network can be reset. For instance, an IMS registration process can be performed in response to the request transmitted at 406.

As a result of the process 400, the QoS-sensitive services can be re-requested and successfully delivered, despite the interrupted connection. By resetting the interrupted connection, a dedicated tunnel may be successfully established through the core network and the IMS network in response to subsequent requests for services.

Figure 5:
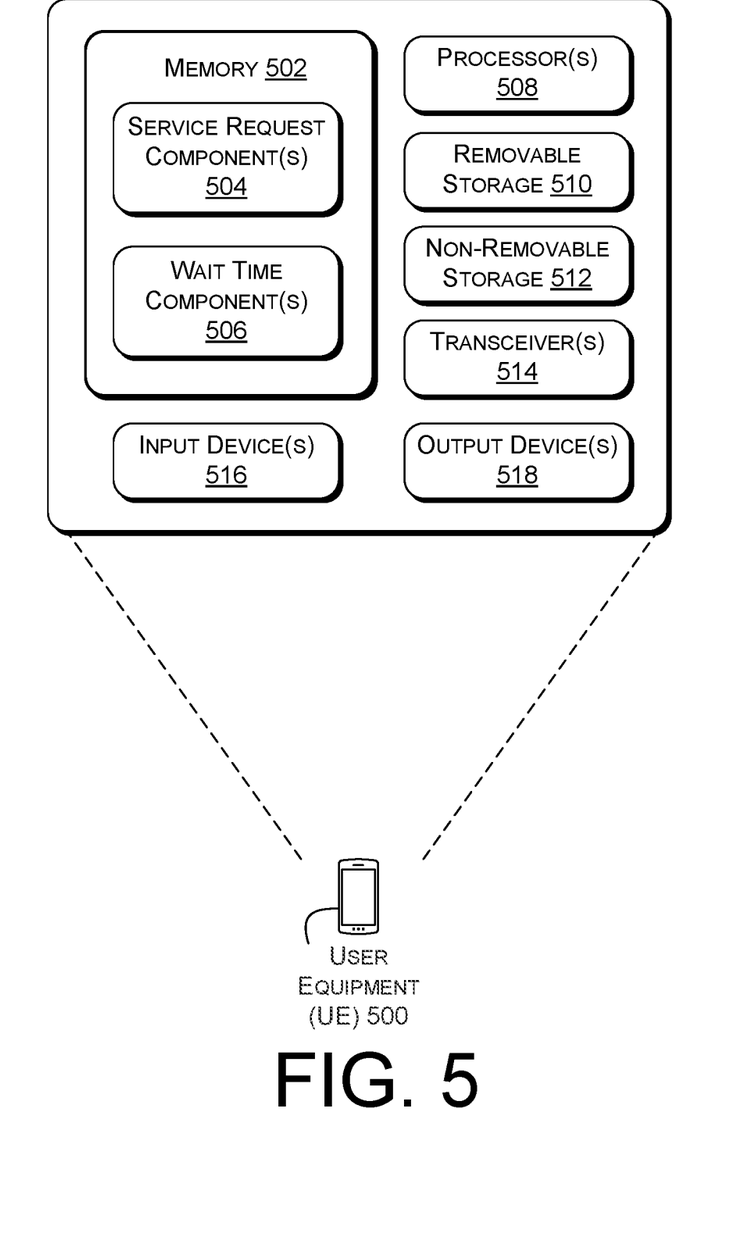
FIG. 5 illustrates a diagram of various example components of a User Equipment (UE).

FIG. 5 illustrates example device(s) 500 to cause a connection associated with an Internet Protocol (IP) Multimedia Subsystem (IMS) network to be reset, as described herein. In some embodiments, some or all of the functionality discussed in connection with FIGS. 1-4 can be implemented in the device(s) 500. Further, the device(s) 500 can be implemented as one or more server computers, a network element on a dedicated hardware, as a software instance running on a dedicated hardware, or as a virtualized function instantiated on an appropriate platform, such as a cloud infrastructure, and the like. It is to be understood in the context of this disclosure that the device(s) 500 can be implemented as a single device or as a plurality of devices with components and data distributed among them.

As illustrated, the device(s) 500 comprise a memory 502. In various embodiments, the memory 502 is volatile (including a component such as Random Access Memory (RAM)), non-volatile (including a component such as Read Only Memory (ROM), flash memory, etc.) or some combination of the two.

The memory 502 may include various components, such as at least one service request component 504 and at least one wait time component 506. The service request component(s) 504 may include instructions for requesting services from a core network. The wait time component 506 may include instructions for determining that a wait time has expired without receiving information about a context of an established dedicated tunnel for the services, as well as for taking certain actions based on the determination. The service request component(s) 504, the wait time component(s) 506, and various other elements stored in the memory 502 can comprise methods, threads, processes, applications, or any other sort of executable instructions. The service request component(s) 504, the wait time component(s) 506, and various other elements stored in the memory 502 can also include files and databases.

The memory 502 may include various instructions (e.g., instructions in the service request component(s) 504 and/or the wait time component(s) 506), which can be executed by at least one processor 508 to perform operations. In some embodiments, the processor(s) 508 includes a Central Processing Unit (CPU), a Graphics Processing Unit (GPU), or both CPU and GPU, or other processing unit or component known in the art.

The device(s) 500 can also include additional data storage devices (removable and/or non-removable) such as, for example, magnetic disks, optical disks, or tape. Such additional storage is illustrated in FIG. 5 by removable storage 510 and non-removable storage 512. Tangible computer-readable media can include volatile and nonvolatile, removable and non-removable media implemented in any method or technology for storage of information, such as computer readable instructions, data structures, program modules, or other data. The memory 502, removable storage 510, and non-removable storage 512 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device(s) 500. Any such tangible computer-readable media can be part of the device(s) 500.

As illustrated in FIG. 5, the device(s) 500 can also include one or more wired or wireless transceiver(s) 514. For example, the transceiver(s) 514 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 514 can utilize Multiple-Input/Multiple-Output (MIMO) technology. The transceiver(s) 514 can include any sort of wireless transceivers capable of engaging in wireless, Radio Frequency (RF) communication. The transceiver(s) 514 can also include other wireless modems, such as a modem for engaging in Wi-Fi, WiMAX, Bluetooth, or infrared communication.

The device(s) 500 also can include input device(s) 516, such as a keypad, a cursor control, a touch-sensitive display, voice input device, etc., and output device(s) 518 such as a display, speakers, printers, etc. These devices are well known in the art and need not be discussed at length here. In particular implementations, a user can provide input to the device(s) 500 via a user interface associated with the input device(s) 516 and/or the output device(s) 518.

Example Clauses

The following clauses represent various examples of the present disclosure. However, implementations are not limited to any of the following clauses.

A. A method performed by a User Equipment (UE), including: transmitting, to a core network, a request for voice services from the core network and an Internet Protocol (IP) Media Subsystem (IMS) network; determining that a wait time has expired without having received a first response confirming that a first dedicated bearer through the core network and the IMS network has been established for the voice services; in response to determining that the first wait time has expired, transmitting, to the core network, a request to reset at least one connection associated with the core network and the IMS network; receiving, from the core network within a second wait time, a second response confirming that a second dedicated bearer through the core network and the IMS network has been established for the voice services; and receiving the voice services from the core network and the IMS network via the dedicated tunnel.

B. The method of clause A, wherein the request to reset the at least one connection causes the core network to perform an IMS registration process.

C. The method of clause A or B, wherein the request for the voice services is a first request for the voice services, wherein the method further includes transmitting, to the core network, a second request for the voice services, and wherein receiving the voice services is in response to transmitting the second request for the voice services.

D. The method of any of clauses A to C, wherein the at least one of the first wait time or the second wait time is between about 5 seconds to about 30 seconds.

E. A method, including: transmitting, to a core network, a first request for services associated with a minimum Quality of Service (QoS) level; determining a wait time has expired without having received a response confirming that a 5th Generation (5G) QoS Indicator (5QI) data flow corresponding to the QoS level has been established; and transmitting, to the core network, a second request to reset a connection associated with the core network and an Internet Protocol (IP) Multimedia Subsystem (IMS) network.

F. The method clause E, wherein the first request is a Session Initiation Protocol (SIP) INVITE message.

G. The method of clause E or F, wherein the services include Guaranteed Bit Rate (GBR) services.

H. The method of any of clauses E to G, wherein the wait time begins in response to transmitting the first request.

I. The method of any of clauses E to H, wherein the wait time is between about 5 seconds to about 30 seconds J. The method of any of clauses E to I, wherein the minimum QoS level includes at least one of a priority of the services, a maximum packet delay budget of the services, or a maximum packet error loss rate of the services.

K. The method of any of clauses E to J, wherein the core network is a 5th Generation (5G) core network.

L. The method of any of clauses E to K, wherein transmitting the second request causes the core network to reset at least one of an N5 interface, Gx interface, an Rx interface, or an SGi interface.

M. The method of any of clauses E to L, wherein transmitting the first request includes initiating a session, wherein the method further includes determining the session has ended, and wherein the second request is automatically transmitted in response to determining that the session has ended.

N. A device, including: at least one processor; and memory storing instructions that, when executed by the at least one processor, cause the at least one processor to perform operations including: transmitting, to a core network, a first request for services associated with a minimum Quality of Service (QoS) level; determining a wait time has expired without having received a response confirming that a 5th Generation (5G) QoS Indicator (5QI) data flow corresponding to the QoS level has been established; and transmitting, to the core network, a second request to reset a connection associated with the core network and an Internet Protocol (IP) Multimedia Subsystem (IMS) network.

O. The device of clause N, wherein the services include Guaranteed Bit Rate (GBR) services.

P. The device of clause N or O, wherein the wait time is between about 5 seconds to about 30 seconds Q. The device of any of clauses N to P, wherein the minimum QoS level includes at least one of a priority of the services, a maximum packet delay budget of the services, or a maximum packet error loss rate of the services.

R. The device of any of clauses N to Q, wherein the core network is a 5G core network.

S. The device of any of clauses N to R, wherein transmitting the second request causes the core network to reset at least one of an N5 interface, a Gx interface, an Rx interface, or an SGi interface.

T. The device of any of clauses N to S, wherein transmitting the first request includes initiating a session, wherein the method further includes determining the session has ended, and wherein the second request is automatically transmitted in response to determining that the session has ended.

U. A computer-readable medium storing non-transitory instructions that, when executed by at least one processor, cause the processor to perform operations including any of the methods of clauses A to M.

V. A system including: at least one processor; and memory storing instructions that, when executed by the at least one processor, cause the at least one processor to perform operations including any of the methods of clauses A to M.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by a User Equipment (UE), comprising:
    transmitting, to a core network, a request for voice services from the core network and an Internet Protocol (IP) Media Subsystem (IMS) network;
    determining that a wait time has expired without having received a first response confirming that a first dedicated bearer through the core network and the IMS network has been established for the voice services;
    in response to determining that the first wait time has expired, transmitting, to the core network, a request to reset at least one connection associated with the core network and the IMS network, wherein transmitting the request to reset causes the core network to reset at least one of a Gx interface, an Rx interface, or an SGi interface;
    receiving, from the core network within a second wait time, a second response confirming that a second dedicated bearer through the core network and the IMS network has been established for the voice services; and
    receiving the voice services from the core network and the IMS network via the dedicated tunnel.

2. The method of claim 1, wherein the request to reset the at least one connection causes the core network to perform an IMS registration process.

3. The method of claim 1, wherein the request for the voice services is a first request for the voice services,
    wherein the method further comprises transmitting, to the core network, a second request for the voice services, and
    wherein receiving the voice services is in response to transmitting the second request for the voice services.

4. The method of claim 1, wherein the at least one of the first wait time or the second wait time is between 5 seconds to 30 seconds.

5. A method, comprising:
    transmitting, to a core network, a first request for services associated with a minimum Quality of Service (QoS) level;
    determining a wait time has expired without having received a response confirming that a 5th Generation (5G) QoS Indicator (5QI) data flow corresponding to the QoS level has been established; and transmitting, to the core network, a second request to reset a connection associated with the core network and an Internet Protocol (IP) Multimedia Subsystem (IMS) network, wherein transmitting the second request causes the core network to reset at least one of a Gx interface, an Rx interface, or an SGi interface.

6. The method of claim 5, wherein the first request is a Session Initiation Protocol (SIP) INVITE message.

7. The method of claim 5, wherein the services comprise Guaranteed Bit Rate (GBR) services.

8. The method of claim 5, wherein the wait time begins in response to transmitting the first request.

9. The method of claim 5, wherein the wait time is between 5 seconds to 30 seconds.

10. The method of claim 5, wherein the minimum QoS level comprises at least one of a priority of the services, a maximum packet delay budget of the services, or a maximum packet error loss rate of the services.

11. The method of claim 5, wherein the core network is a 5th Generation (5G) core network.

12. The method of claim 5, wherein transmitting the first request comprises initiating a session, wherein the method further comprises determining the session has ended, and wherein the second request is automatically transmitted in response to determining that the session has ended.

13. A device, comprising:

at least one processor; and memory storing instructions that, when executed by the at least one processor, cause the at least one processor to perform operations comprising:

transmitting, to a core network, a first request for services associated with a minimum Quality of Service (QoS) level, wherein transmitting the first request comprises initiating a session;

determining a wait time has expired without having received a response confirming that a 5th Generation (5G) QoS Indicator (5QI) data flow corresponding to the QoS level has been established;

determining the session has ended; and transmitting, to the core network, a second request to reset a connection associated with the core network and an Internet Protocol (IP) Multimedia Subsystem (IMS) network, wherein the second request is automatically transmitted in response to determining that the session has ended.

14. The device of claim 13, wherein the services comprise Guaranteed Bit Rate (GBR) services.

15. The device of claim 13, wherein the wait time is between 5 seconds to 30 seconds.

16. The device of claim 13, wherein the minimum QoS level comprises at least one of a priority of the services, a maximum packet delay budget of the services, or a maximum packet error loss rate of the services.

17. The device of claim 13, wherein the core network is a 5G core network.

18. The device of claim 13, wherein transmitting the second request causes the core network to reset at least one of a Gx interface, an Rx interface, or an SGi interface.

* * * * *